April 7, 1959　　　E. W. SAIBERLICH　　　2,881,024
AUXILIARY BODIES FOR TRUCKS
Filed Feb. 12, 1957　　　　　　　　　　　　2 Sheets-Sheet 1
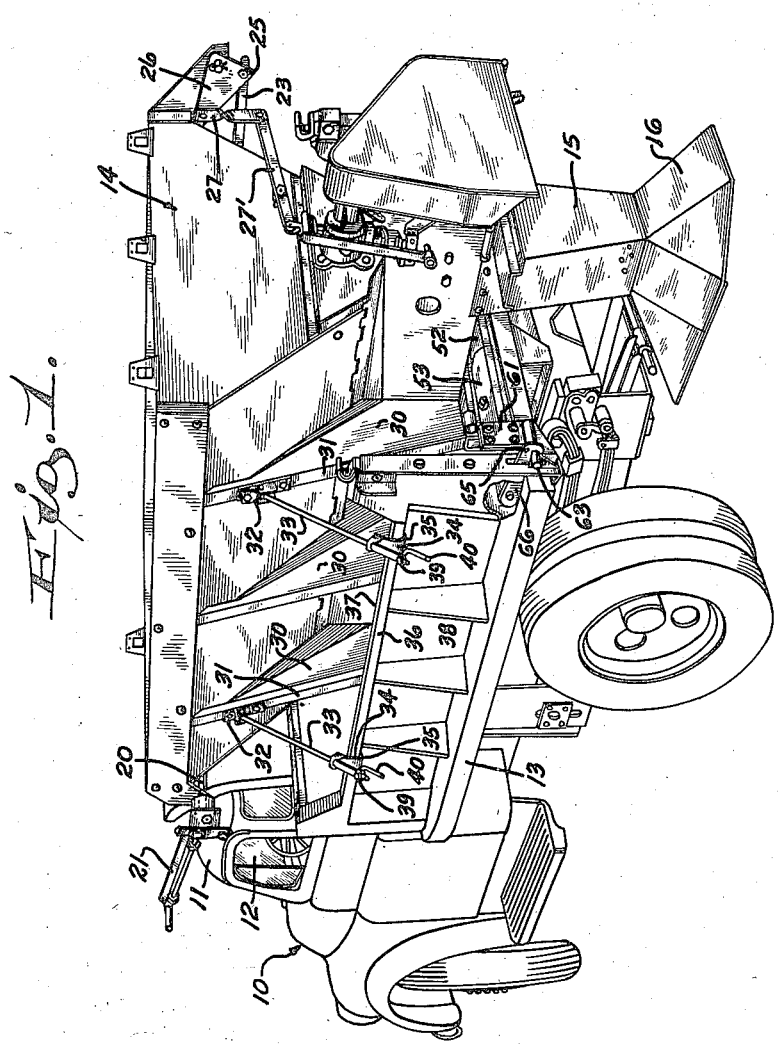
INVENTOR.
Erwin W. Saiberlich
BY
ATTORNEYS.

April 7, 1959   E. W. SAIBERLICH   2,881,024
AUXILIARY BODIES FOR TRUCKS
Filed Feb. 12, 1957   2 Sheets-Sheet 2
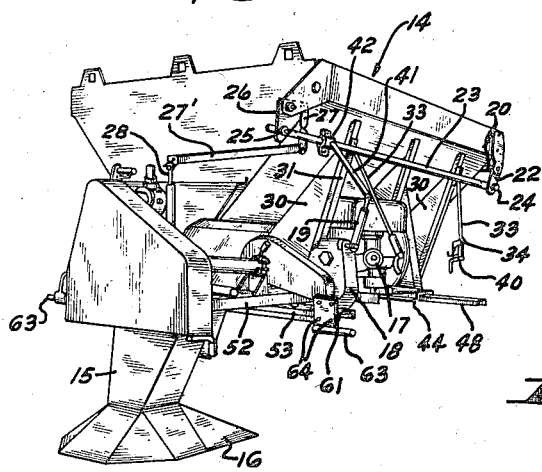
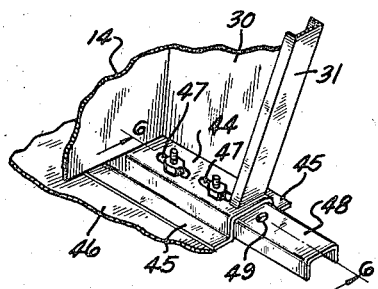
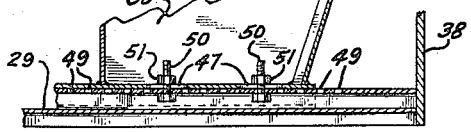
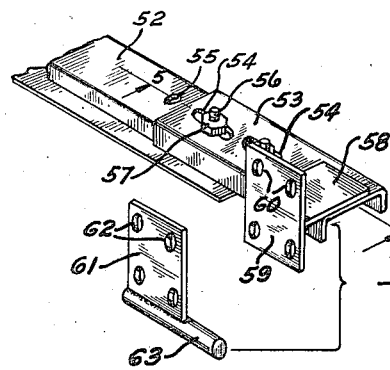
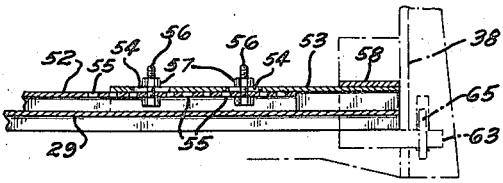
INVENTOR.
Erwin W. Saiberlich
BY
Morsell & Morsell
ATTORNEYS.

United States Patent Office 2,881,024
Patented Apr. 7, 1959

2,881,024

AUXILIARY BODIES FOR TRUCKS

Erwin W. Saiberlich, Menasha, Wis., assignor to Fox River Tractor Company, Appleton, Wis., a corporation of Wisconsin Application February 12, 1957, Serial No. 639,680

10 Claims. (Cl. 296—35)

This invention relates to improvements in auxiliary bodies for trucks.

Municipalities and other government agencies charged with the maintenance of streets and highways have need at certain times of the year, particularly in the north, for trucks equipped to spread materials such as sand and salt on the streets and highways, to control ice conditions. There is also a demand during certain periods of the year for trucks to spread chips. Equipment which has heretofore been provided has been suitable for this use only. As a result, such equipment is uselessly tied up in storage during a large part of the year.

Most municipalities, however, have a number of standard dump trucks and platform trucks which are used for various general purposes, and it is a general object of the present invention to provide an improved auxiliary body which is readily attachable to and detachable from any such standard truck of sufficient size, to thereby adapt such truck for a selected special purpose.

A more specific object of the invention is to provide an auxiliary body as above described which is specially adapted for the spreading of sand, chips and the like.

A further object of the invention is to provide an auxiliary body which may be placed in a standard truck body such as a dump truck body and quickly and readily secured thereto without welding, without drilling any holes, and without mutilating or altering the truck body in any way.

A further object of the invention is to provide in combination with a truck body an auxiliary body therein, and cooperable means on the truck body and auxiliary body for readily detachably securing the two together.

A further object of the invention is to provide a combination as above described wherein the auxiliary body has lateral projections at the rear thereof which are so positioned as to be detachably engaged by the tailgate latching levers of the truck body to aid in holding the auxiliary body in position.

A further object of the invention is to provide in combination with a truck having a cab with a driver's seat and having a truck body, an auxiliary body for spreading sand, chips and the like within said truck body, and control mechanism on the auxiliary body having a manually operable lever so positioned on the auxiliary body as to be readily accessible to the driver in the truck.

With the above and other objects in view, the invention consists of the improvements in auxiliary bodies for trucks, and all of its parts and combinations as set forth in the claims, and all equivalents thereof.

In the accompanying drawings, illustrating one complete embodiment of the preferred form of the invention, in which the same reference numerals designate the same parts in all of the views:

Fig. 1 is a perspective view of a dump truck showing the auxiliary body connected thereto;

Fig. 2 is a perspective view of the auxiliary body alone looking principally at the opposite side from that shown in Fig. 1;

Fig. 3 is a fragmentary perspective view showing one of the front adjustable spacer members;

Fig. 4 is a fragmentary perspective view showing one of the rear adjustable spacer members which view also shows in separated condition, the plate which carries the laterally projecting pin for coaction with one of the tailgate latching levers of the truck;

Fig. 5 is a fragmentary sectional view taken on the line 5—5 of Fig. 4, the view extending through the floor of the truck body, and the dot and dash lines illustrating the coaction of the laterally projecting pin with the tailgate latching members and associated parts; and Fig. 6 is a fragmentary sectional view taken on the line 6—6 of Fig. 3, a fragment of the floor and side wall of the truck being also shown.

Referring more particularly to the drawings, the numeral 10 designates a truck of a standard type having a cab 11, a driver's window 12, and a standard body 13. In the exemplification of the invention shown in Fig. 1, this is a standard dump truck body with the tailgate removed. It may, however, be any one of several types of bodies, the main requirement being that it have sufficient size to receive the auxiliary body 14. The device is also suitable for use on platform trucks.

The auxiliary body 14 is adapted to convert the truck body 13 to a selected special use. The particular body illustrated in Fig. 1 with which the present invention is specially concerned, is a spreader unit for spreading sand, salt, chips, calcium chloride, or other materials on a street or highway. The present invention has particular utility in connection with auxiliary units of a type which are only used spasmodically, and provides means whereby the auxiliary body may be quickly separated and removed from the truck to make the truck available for other work.

The details of the operating mechanism of the spreader unit form no part of the present application. The unit shown in Fig. 1, however, includes a vertical spreader housing 15 at the rear having an open bottomed spreader skirt 16 at its lower end housing a suitable device for spreading material such as sand or salt onto the road below. There is suitable driving mechanism on the auxiliary body for the spreading device including a motor 17 (see Fig. 2). Transmission mechanism leading from the motor includes clutch mechanism 18 having an externally projecting clutch operating lever 19.

At the front of the auxiliary body as shown in Fig. 1, is a horizontal shaft 20. A manually operable lever 21 which is rigidly connected to one end of the shaft 20 projects forwardly from the auxiliary body, as shown in Fig. 1, so that a driver in the cab 11 may reach his arm out of the window 12 to operate the control lever 21 of the auxiliary body. Rigidly connected at its upper end to the other end of the horizontal shaft 20 is an arm 22 (see Fig. 2). A rod 23 is pivotally connected at one end as at 24 and the lower end of the arm 22. The other end of the rod is pivotally connected as at 25 to a lower corner portion of a pivoted triangular plate 26 (see Fig. 1). The plate 26 has its forward end pivotally connected to the upper end of a link 27. The link 27 is twisted and has its lower end connected with one end of an intermediately pivoted lever 27'. The other end of the lever 27' is connected to mechanism 28 (see Fig. 2) for controlling the flow of material from the auxiliary body into the spreader housing 15. A link 41 is pivotally connected at its upper end to the rod 23 as at 42, and at its lower end to the upper end of the clutch operating lever 19. Thus, the body is so worked out that when it is positioned in the truck as shown in Fig. 1, the clutch for the driving mechanism as well as the material control devices may be operated by the driver, through the lever 21, without getting out of the cab. It is to be noted that this is so devised that it requires no alteration of the truck.

The auxiliary body 14 is generally a truncated triangle in cross section so that it has a trough-like bottom of substantially less width than the width of the truck body 13. This body also includes laterally projecting webs 30 having outwardly facing flanged edge portions 31. Pivotally connected to upper portions of the flanges 31 as at 32 are the upper ends of tie rods 33. Each tie rod has a clamping bracket 34 slidable thereon, and each bracket has a hooked edge portion 35 for engagement with a downwardly bent flange 36 of the top channel 37 of the adjacent side 38 of the truck body. Nuts 39 which are threaded on the outer ends of the tie rods 33 are provided with crank extensions 40. Thus, by rotating the cranks 40, the clamping brackets 34 may be caused to move upwardly on the tie rods 33 to clampingly engage with the flanges 36. In the body illustrated there are two tie rods 33, with associated mechanism, on each side of the auxiliary body.

Projecting laterally at the bottom of the auxiliary body, adjacent the forward end thereof and preferably adjacent the forwardmost of the webs 30 are channel portions 44 (see Figs. 2 and 3), one on each side of the body. Each channel portion has outwardly projecting bottom flanges 45 which are adapted to rest on the floor 46 of the truck, as shown in Fig. 3. The channel-shaped flange 31 at the outer edge of the adjacent web 30 has its lower end welded to the top of the channel 44. Each channel spacer 44 has slots 47 in its top. Telescopically slidable in each channel spacer 44 is an adjustable spacer member 48 having a series of bolt holes 49 therein. Bolts 50 extending upwardly through selected ones of the holes 49 and through the slots 47, and having nuts 51 threaded on their upper ends serve to adjustably connect the spacer members 48 in position. During installation of the auxiliary body the spacer members 48 may be extended until the outer ends strike the inner sides of the side portions 38 of the truck body, as is shown in Fig. 6.

Similar channel-shaped members 52 project laterally from the rear of the auxiliary body, as shown in Figs. 2, 4 and 5, one on each side. Spacer extensions 53, preferably channel-shaped, slide on top of the channels 52, as shown in Figs. 4 and 5. The spacer members 53 have elongated slots 54 and the members 52 have a series of bolt holes 55. By use of the bolts 56 and nuts 57, the members 54 may be adjusted outwardly until the extreme ends abut the inner sides of the side walls 38 of the truck body, as shown in Fig. 5.

Welded on top of each spacer member 53 near its outer end and projecting rearwardly therefrom is a plate 58 carrying an upright plate 59 having slotted upright bolt holes 60. A similar plate 61 having similarly shaped bolt holes 62 has a locking pin 63 welded to its lower edge and projecting laterally therefrom. By use of nuts and bolts 64 extending through the slotted openings 60 and 62, the plates 61 may be secured in a desired position of vertical adjustment to the plates 59 so as to correctly position the projecting ends of the pins 63 for engagement by the latching levers 65 of the truck body, as shown in Figs. 5 and 1. These latching levers are standard equipment on bodies having swingable tailgates, and are pivotally connected at their inner ends as at 66 (Fig. 1). As a result of this arrangement the projecting ends of the pins 63 may be engaged by the latching levers 65, as shown in Fig. 1, to prevent forward or rearward movement of the auxiliary body 14 relative to the main body 13. The spacer members 48 and 53 on both sides may be so adjusted as to properly center the auxiliary body in the truck body 13. When the spacer members 48 and 53 are locked in the position shown in Figs. 5 and 6, the auxiliary body is braced against lateral shifting movement within the main body 13. The tie rods 33, when tightened to the side flanges 36 also serve to prevent lateral shifting of the auxiliary body and, in addition, serve to anchor the auxiliary body down on the bottom of the main truck body so that there is no tendency for the auxiliary body to bounce up and down during travel.

It is apparent from the above that means is provided by the present invention whereby an auxiliary body may be quickly secured in a standard truck body and firmly anchored against lateral shifting movement, against longitudinal movement, and against vertical movement. It is also apparent that the body may be attached or detached in a relatively short time without drilling any holes in the truck body, without any welding, and without any other type of alteration.

In addition to the above, the auxiliary body is so worked out that it carries its own control lever in such a position at a forward end thereof, that when the body is detachably connected in place in a truck the control lever is located conveniently to the driver in the cab.

While the invention has particular utility in connection with an auxiliary body for spreading sand, chips, or the like, it is nevertheless applicable for use in connecting various other types of auxiliary bodies to standard dump truck bodies.

It is to be understood that the present invention is not to be limited to the exact details of construction shown and described, for obvious modifications will occur to persons skilled in the art.

What I claim is:

1. In a truck having a tail gate type main truck body with side walls and having rear end tail gate latching levers provided with rearwardly projecting latch-shaped ends, an auxiliary body positioned within said main body on the floor thereof, and cooperating latching members projecting laterally from each side of the auxiliary body adjacent the rear end thereof and having parts projecting transversely of said latching levers and releasably engaged by said latch-shaped ends thereof readily releasably locking the auxiliary body against longitudinal movement in the main body when the tail gate is removed from the latter.

2. In a truck having a tail gate type main truck body with side walls and having rear end tail gate latching levers provided with rearwardly projecting latch-shaped ends, an auxiliary body having a portion of less width than said main body positioned within said main body on the floor thereof, and extensible positioning means projecting laterally from each side of the auxiliary body adjacent the rear thereof and having parts extending transversely of said latching levers and releasably engaged by the latch-shaped ends thereof readily releasably locking the auxiliary body against longitudinal movement and having other parts engaging the inner sides of the side walls of the main body to prevent lateral shifting of the auxiliary body, and means for releasably securing said extensible means in predetermined laterally extended positions to bring about said engagements.

3. In a tail gate type main truck body having side walls and having a rear end with rearwardly projecting tail gate latching levers, an auxiliary body having a portion of less width than said main body positioned within the latter on the floor thereof, spacer members extensibly connected to said auxiliary body at the sides thereof and laterally extended into contact with the inner sides of the truck side walls, and means for releasably locking said spacer members in said extended position, one set of said spacer members being adjacent the rear end of the main truck body and having laterally projecting parts releasably engaged by said tail gate latching levers.

4. In a tail gate type main truck body having side walls and having tail gate latching levers projecting rearwardly from the rear ends of said side walls, an auxiliary body having a portion of less width than said main body positioned within the latter on the floor thereof, spacer members extensibly connected to sides of said auxiliary body and laterally extended into contact with the inner sides of the truck side walls, means for releasably locking said spacer members in said extended position, one set of said spacer members being adjacent the rear end of the truck body and having laterally projecting parts overlapping the rear ends of said side walls and releasably engaged by said tail gate latching levers, tie rods having connection with said auxiliary body at the side thereof a substantial distance above the side walls of the truck and projecting downwardly toward said side walls and having connection therewith, the connections at least one of the ends of said tie rods being detachable and adjustable.

5. In a tail gate type main truck body having side walls and having a rear opening between the rear ends of said side walls and having rear end rearwardly projecting tail gate latching levers, an auxiliary body positioned within said main body on the floor thereof and having a rear extension projecting through said rear opening beyond the rear end of the main truck body and having a portion beyond the rear end of the truck depending from said extension, and means projecting laterally from each side of the auxiliary body forwardly of said depending portion and provided with laterally projecting parts releasably engaged by said tail gate latching levers.

6. In a main truck body having side walls and having a rear opening between the rear ends of said side walls and having rearwardly projecting tail gate latching levers, an auxiliary body having inwardly tapered sides providing a bottom portion of less width than the width of said main truck body positioned within the latter on the floor thereof and having a rear extension projecting through said rear opening beyond the rear end of the main truck body and having mechanism supported solely by said auxiliary body depending downwardly from said extension beyond the rear end of the truck body, and co-operating means on the auxiliary body and main truck body located forwardly of said mechanism detachably locking the auxiliary body in such a position that said mechanism is maintained in a predetermined position with respect to the rear end of the main truck body and with respect to the sides, said means including laterally projecting members on the auxiliary body releasably engaging said tail gate latching levers.

7. In a tailgate type main truck body having side walls and having tailgate latching levers projecting rearwardly from the rear ends of said side walls, an auxiliary body positioned within said main body on the floor thereof, spacer members extensibly connected to sides of said auxiliary body and laterally extended into contact with the inner sides of the truck side walls, and means for releasably locking said spacer members in said extended position, one set of said spacer members being adjacent the rear end of the main truck body and having parts overlapping the rear ends of said side walls and releasably engaged by said tailgate latching levers.

8. In a tailgate type main truck body having side walls and having tailgate latching levers projecting rearwardly from the rear ends of said side walls, an auxiliary body positioned within said main body on the floor thereof, spacer members extensibly connected to sides of said auxiliary body and laterally extended into contact with the inner sides of the truck side walls, means for releasably locking said spacer members in said extended position, one set of said spacer members being adjacent the rear end of the truck body and having parts overlapping the rear ends of said side walls and releasably engaged by said tailgate latching levers, tie rods pivotally connected to sides of said auxiliary body a substantial distance above the side walls of the truck and extending downwardly and outwardly toward said side walls, and adjustable means on the outer ends of said rods engaging with said side walls of the truck to releasably lock the auxiliary body down on the floor of the truck body.

9. In a tailgate type main truck body having side walls and having a rear opening between the rear ends of said side walls and having tailgate latching levers projecting rearwardly from the rear ends of said side walls, an auxiliary body positioned within said main body on the floor thereof and having a rear extension projecting through said rear opening beyond the rear end of the main truck body and having a portion beyond the rear end of the truck depending from said extension, and means projecting laterally from each side of the auxiliary body forwardly of said depending portion and provided with parts overlapping the rear ends of said side walls of the main truck body and releasably engaged by said tailgate latching levers to lock the auxiliary body in such a position that the depending portion of the auxiliary body is maintained in a predetermined position with respect to the rear end of the main truck body.

10. In a readily detachable auxiliary body having a lower portion of downwardly tapered cross section and of substantially less width than the spacing between the sides of a conventional truck body, transversely extending bottom supports projecting from the sides of the auxiliary body, spacer members telescopically engaged with said bottom supports for lateral movement into contact with the side walls of a truck body when the auxiliary body is placed within said truck body with the bottom supports on the floor thereof, and means for releasably locking said spacer members in a selected extended position to maintain the body against lateral shifting.

References Cited in the file of this patent

UNITED STATES PATENTS

| | | |
|---|---|---|
| 780,708 | Collins | Jan. 24, 1905 |
| 935,754 | Gorby | Oct. 5, 1909 |
| 1,384,162 | Shannon | July 12, 1921 |
| 1,403,307 | Fisher | Jan. 10, 1922 |
| 1,425,541 | Press et al. | Aug. 15, 1922 |
| 1,470,324 | Hunter | Oct. 9, 1923 |
| 1,521,156 | Jenkins | Dec. 30, 1924 |
| 1,896,254 | Smith | Feb. 7, 1933 |
| 2,173,076 | Stetson | Sept. 12, 1939 |
| 2,559,029 | Randolph | July 3, 1951 |